United States Patent [19]
Franz et al.

[11] 3,871,666
[45] Mar. 18, 1975

[54] SHAFT PACKING

[75] Inventors: Dietmar Franz, Lampertheim; Willi Schoneberger, Wiesbaden; Gerd Upper, Unterflockenbach, all of Germany

[73] Assignee: Firma Carl Freduenburg, Weinheim, Germany

[22] Filed: Mar. 5, 1973

[21] Appl. No.: 338,192

[30] Foreign Application Priority Data
Mar. 3, 1972 Germany............................ 2210209

[52] U.S. Cl....................... 277/59, 277/69, 277/71, 277/75
[51] Int. Cl............................................. F16j 15/32
[58] Field of Search............ 277/58, 59, 68, 69, 71, 277/75, 70, 16; 308/36.2

[56] References Cited
UNITED STATES PATENTS

| | | | |
|---|---|---|---|
| 1,416,988 | 5/1922 | Sherwood | 308/36.2 |
| 1,990,519 | 2/1935 | Bigelow et al. | 277/70 |
| 2,348,586 | 5/1944 | Antonelli | 277/71 |
| 2,350,697 | 6/1944 | Petch | 277/49 |
| 3,413,008 | 11/1968 | Greiner | 277/58 |

FOREIGN PATENTS OR APPLICATIONS
554,331  6/1943  United Kingdom............... 277/75

Primary Examiner—Samuel B. Rothberg
Attorney, Agent, or Firm—Stevens, Davis, Miller & Mosher

[57] ABSTRACT

A shaft packing including a damming component over a part of the shaft periphery which reduces the free space between a sealing element and the shaft to a narrow slit. An oil inlet and exhaust are located at the ends of this damming component. The free space between the shaft, the sealing element and the surrounding part e.g., the housing or an insert is shaped in a way to assure a laminar flow of the oil, being pumped by friction exerted by the shaft from the oil inlet to the outlet.

The damming component is preferably made of a rubber-elastic material and may be fashioned in one piece with the sealing element.

8 Claims, 7 Drawing Figures

SHAFT PACKING

BACKGROUND OF THE INVENTION

This invention relates to shaft packing. The life of rubber-elastic seal components depends on the temperature to which these components are exposed. High temperatures reduce their life and may result from high ambient temperatures as well as from friction, generated by relative motion between the shaft and the packing.

Pumping systems have already been provided for the removal of heat causing undesirably high temperatures in which the lubricant is made to circulate between a chamber defined by the shaft and two sealing components and a heat exchanger. It has been found in practice that such equipment, particularly when of an automatic nature, is prone to interferences. Furthermore, equipment price and construction expenditures are fairly high because the necessary safety circuit and monitor of the circulatory cooling system often represent a multiple of the construction expenditures or costs of the pumping system.

It is a part of the state of the art for oil-lubricated bearings, such as a spindle box with high rpm and truck differential gears, to generate an oil stream at one location of the periphery of the rotating part by a wiping and damming component so as to achieve better heat conduction as well as bearing lubrication.

It is further part of the state of the art to provide oil circulation, without a pumping system, in sleeve bearings by making use of loose or fixed oil rings. Generation of lubrication circulation by means of oil rings as known in sleeve bearings, however, is not feasible with respect to packings because of the distinct danger of damage from a loose oil ring. On the other hand, the arrangement of fixed oil rings adversely affects the possibility of assembling the packing component, that is, one must make use of a split ring or one of relatively high elasticity, so that unfavorable restrictions regarding construction and operation are involved.

SUMMARY OF THE INVENTION

The present invention addresses itself to the task of providing a shaft packing of such nature that oil circulation is achieved without requiring any special pumping system and by means of components that will neither damage the packing elements during operation nor will require adverse restrictions as regards construction.

The solution of this problem involves a damming component of rubber-elastic material, between two sealing elements, which reduces the free space between the gaskets over part of the shaft periphery to a slit allowing no oil or only very little to pass through, and an oil inlet or oil exhaust at both ends of the damming component, the remaining space traversed by the oil being so shaped that the flow of the oil will be laminar for the given range of speed.

In one embodiment, the shaft packing is provided with an annular insert including the damming component.

However, the damming component may also be fashioned in one piece with the sealing element. It is appropriate in many cases that slits be provided between the damming component and the membrane part, so that the membrane part retains its ability to fit any displacement of the shaft surface, for example, in case of shaft eccentricity.

It has been found that the required laminar flow is achieved if the radial height of the free space does not exceed one-half inch. Optimal pumping action under laminar flow conditions is reached in a range of one-third to one-fourth inch.

In practical use these values of height assure laminar flow in the conventional range of shaft diameters and speeds and oil viscosity.

Preferably the damming component consists of a rubber-elastic material or of the same material as the shaft gasket. The bore holes or the tubes connected to the oil inlet or exhaust should be appropriately tangential to the shaft surface.

BRIEF DESCRIPTION OF THE DRAWING

The drawings show, schematically, embodiments of the invention.

DETAILED DESCRIPTION OF THE INVENTION

Figure 1:
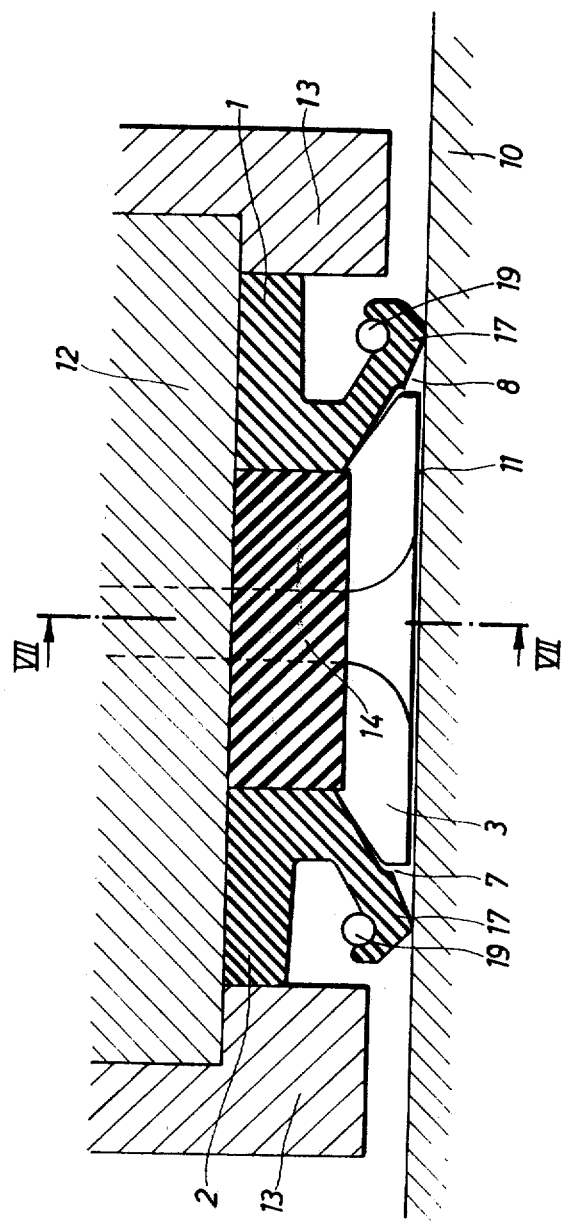
FIGS. 1 and 2 are cross-sections through the shaft packing with two sealing elements and a damming element used as an insert.

Damming component 3 is located between sealing elements 1 and 2. These elements are located in housing 12 which is laterally bounded by covers 13. The reduced cross-sectional area or slit between damming component 3 and shaft 10 is referenced as 11. The cross-section shown in FIG. 1 is located before oil passage 14 through which the lubricant will flow outwardly on account of the pressure head generated at this spot for clock-wise rotation of the shaft. Motion of the lubricant is achieved by adherence to the moving shaft surface.

Figure 2:
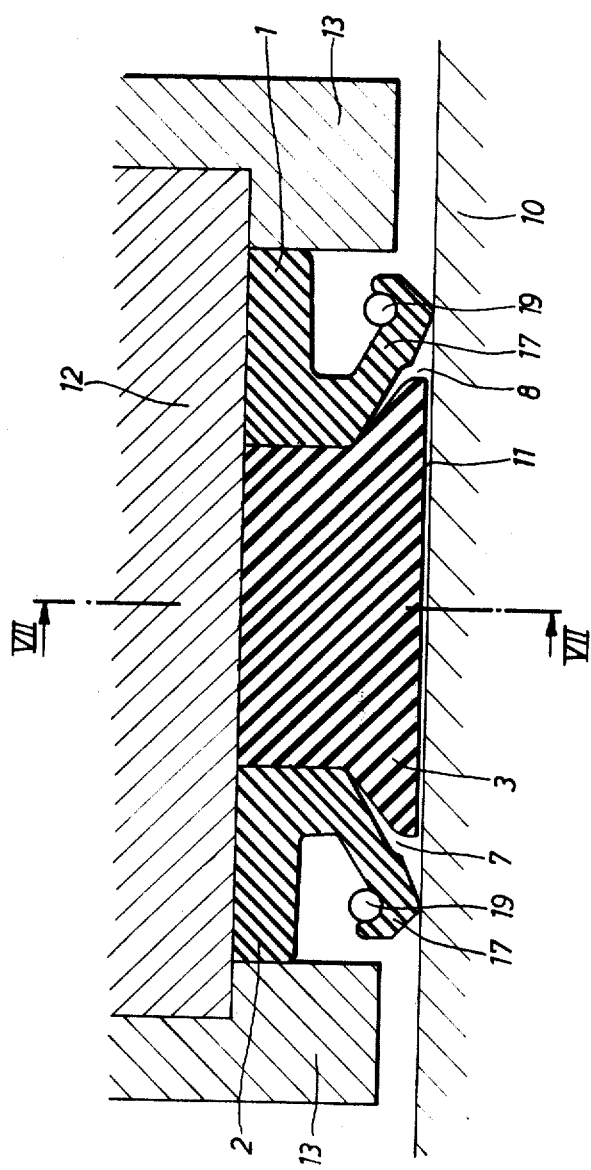

FIG. 1 shows an elevation of that part of the insert which is fashioned as damming component 3 and which is nearer shaft 10 than other parts, whereas the damming component is shown in cross-section in its entirety in FIG. 2. The cross-sectional area of FIG. 1 which is located between sealing elements 1 and 2 passes through an annular part referenced as 16 (see FIG. 7) forming one ring with the damming component and preferably made in one piece with it, but which does not itself generate the pressure head, but rather merely represents the peripheral boundary of the space filled with lubricant around shaft 10.

Figure 3:
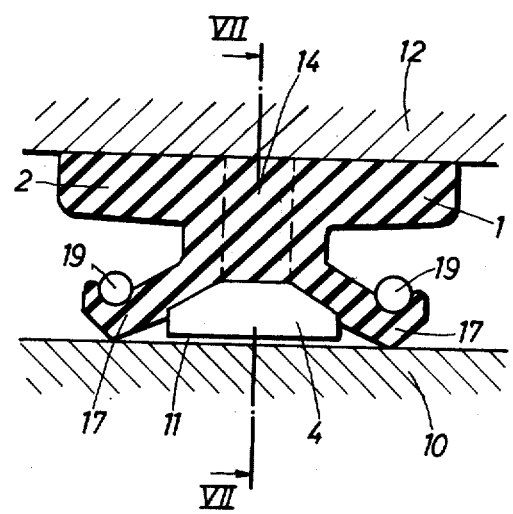
FIGS. 3 and 4 show cross-sections of the shaft packing with two sealing elements forming one piece with the damming component.
Figure 4:
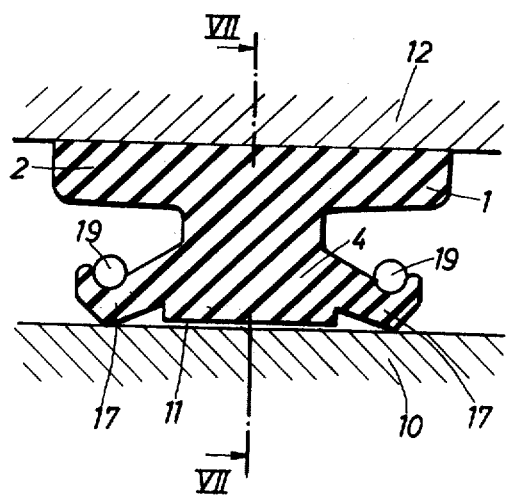

The embodiments shown in FIGS. 3 and 4 differ from those in FIGS. 1 and 2 in that the sealing elements 1 and 2 are of one piece with the damming component 3. That part of damming component 4 and its entire cross-section, which is nearer shaft 10, may be seen in FIGS. 3 and 4, as was similarly the case for FIGS. 1 and 2.

Figure 5:
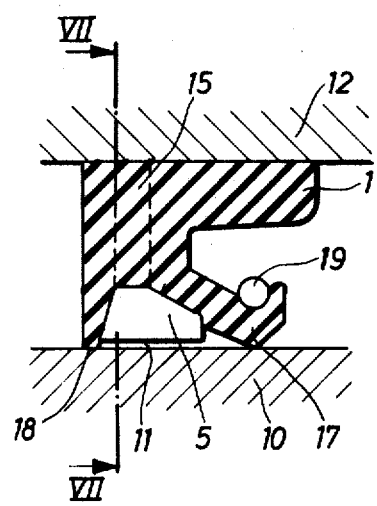
FIGS. 5 and 6 illustrate cross-sections of the shaft packing with only one sealing element.
Figure 6:
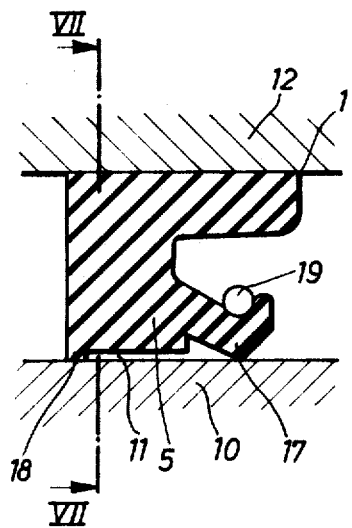
Figure 7:
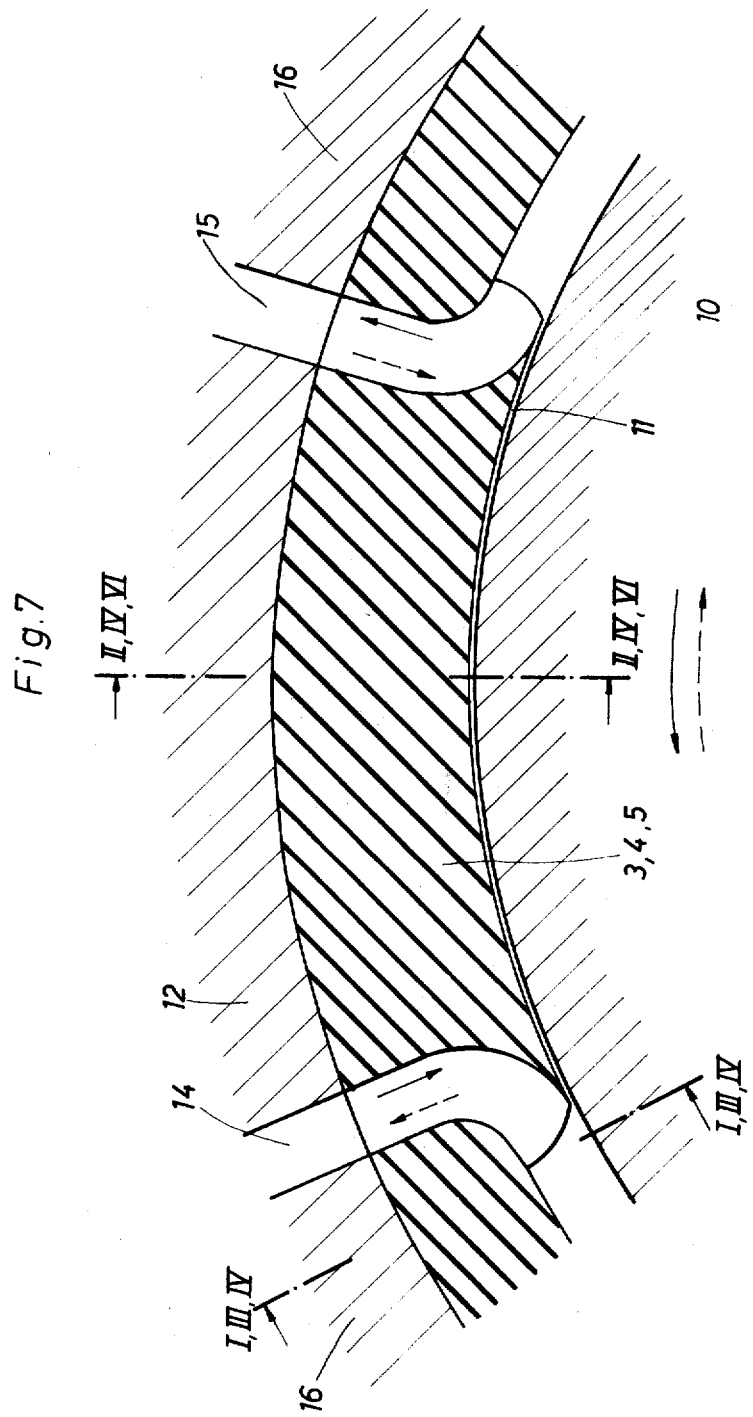
FIG. 7 is a section through the shaft packings according to FIGS. 1 - 6 in a plane normal to the shaft axis.

It should be particularly emphasized that FIG. 7 illustrates a section in a radial plane of the three different embodiments according to FIGS. 1 and 2, or 3 and 4, or 5 and 6. Hence the three embodiments do not differ as regards this section.

The third embodiment shown in FIGS. 5 and 6 represents a shaft packing which, as contrasted with the embodiments of FIGS. 1 and 2 or FIGS. 3 and 4 is provided with an asymmetrical construction element 5, this shaft packing being provided with a sealing lip 17 at only on one side, whereas sealing on the other side of the space filled with lubricant is achieved by means of a cylindrical contact surface 18.

A spring 19, for instance an annular garter spring, is used to compress the sealing lip 17 against shaft 10. Such additional and known compressing means are not required in all cases, as is also known.

The shaft gasket or the annular part with which it is fashioned together or into one piece also may consist of materials other than rubber-elastic such as metal.

What is claimed is:

1. A shaft packing comprising two lip type sealing elements of a rubber-elastic material, a damming component between said two sealing elements, said damming component reducing free space between a shaft and the sealing elements over part of the shaft periphery to a slit which substantially blocks oil from flowing therethrough, and an oil passage at the remaining circumference at both ends of the damming component, the passage traversed by the oil providing a free space and being so shaped that laminar flow will reliably occur for a given shaft speed.

2. A shaft packing according to claim 1 wherein the damming component comprises an annular insert.

3. A shaft packing according to claim 1, comprising a damming component made in one piece with the sealing elements.

4. A shaft packing according to claim 3, comprising slits between the damming component and a packing washer of the sealing elements.

5. A shaft packing according to claim 1 wherein the damming component is made of rubber-elastic material.

6. A shaft packing according to claim 1 further comprising conducting tubes or bores connected to the oil passage, said tubes or bores being tangential to the shaft periphery.

7. A shaft packing according to claim 1 wherein the radial height of the free space does not exceed one-half inch.

8. A shaft packing according to claim 1 wherein the radial height of the free space does not exceed one-third inch.

* * * * *